US010465938B2

(12) United States Patent
Naito et al.

(10) Patent No.: US 10,465,938 B2
(45) Date of Patent: Nov. 5, 2019

(54) INDOOR UNIT FOR AIR-CONDITIONING APPARATUS (71) Applicant: Mitsubishi Electric Corporation, Tokyo (JP)

(72) Inventors: Yosuke Naito, Tokyo (JP); Masayuki Oishi, Tokyo (JP); Shuhei Yokota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 116 days.

(21) Appl. No.: 15/573,146

(22) PCT Filed: Jul. 30, 2015

(86) PCT No.: PCT/JP2015/071697
§ 371 (c)(1),
(2) Date: Nov. 10, 2017

(87) PCT Pub. No.: WO2017/017849
PCT Pub. Date: Feb. 2, 2017

(65) Prior Publication Data
US 2018/0106494 A1 Apr. 19, 2018

(51) Int. Cl.
*F24F 13/10* (2006.01)
*F24F 11/89* (2018.01)
(Continued)

(52) U.S. Cl.
CPC ............ *F24F 11/89* (2018.01); *F24F 1/0007* (2013.01); *F24F 13/20* (2013.01); *G01J 1/0219* (2013.01);
(Continued)

(58) Field of Classification Search
CPC ........... F24F 13/10; F24F 13/20; F24F 1/0007
See application file for complete search history.

(56) References Cited

U.S. PATENT DOCUMENTS

2008/0140349 A1* 6/2008 Behera ............... G05B 23/0283
702/182
2010/0175397 A1 7/2010 Choi et al.

FOREIGN PATENT DOCUMENTS

EP 2 184 553 A1 5/2010

OTHER PUBLICATIONS

International Search Report of the International Searching Authority dated Nov. 2, 2015 for the corresponding international application No. PCT/JP2015/071697 (and English translation).
(Continued)

*Primary Examiner* — Kevin K Pyo
(74) *Attorney, Agent, or Firm* — Posz Law Group, PLC (57) ABSTRACT

Provided is an indoor unit for an air-conditioning apparatus including: a sensor box accommodating a sensor configured to detect light; a gearbox configured to hold the sensor box so as to be rotatable, and to be moved along a first axis together with the sensor box; a first motor configured to apply a force causing the sensor box to rotate; a second motor configured to apply a force causing the gearbox to move along the first axis; and a shaft inserted through the gearbox to be rotated by receiving the force from the first motor, in which, in the gearbox, the shaft is inserted, and the gear is accommodated so that a rotational force transmitted from the shaft is transmitted to the sensor box, the gear being movable along the first axis.

12 Claims, 11 Drawing Sheets

(51) Int. Cl.
*F24F 13/20* (2006.01)
*F24F 1/0007* (2019.01)
*G01J 1/02* (2006.01)
*G01J 1/04* (2006.01)
*G01J 5/04* (2006.01)
*G01J 5/02* (2006.01)
*G01J 5/08* (2006.01)
*G01J 5/00* (2006.01)
*F24F 120/12* (2018.01)
*F24F 120/14* (2018.01)
*F24F 120/00* (2018.01)
*F24F 110/10* (2018.01)

(52) U.S. Cl.
CPC ........... *G01J 1/0266* (2013.01); *G01J 1/0271* (2013.01); *G01J 1/0403* (2013.01); *G01J 5/0025* (2013.01); *G01J 5/025* (2013.01); *G01J 5/047* (2013.01); *G01J 5/089* (2013.01); *F24F 2013/207* (2013.01); *F24F 2110/10* (2018.01); *F24F 2120/00* (2018.01); *F24F 2120/12* (2018.01); *F24F 2120/14* (2018.01)

(56) References Cited

OTHER PUBLICATIONS

Office Action dated Aug. 9, 2018 issued in corresponding AU patent application No. 2015403945.
Office action dated Jul. 3, 2019 issued in corresponding CN patent application No. 201580081871.3 (and English translation thereof).

* cited by examiner

INDOOR UNIT FOR AIR-CONDITIONING APPARATUS

CROSS REFERENCE TO RELATED APPLICATION

This application is a U.S. national stage of International Patent Application No. PCT/JP2015/071697 filed on Jul. 30, 2015, the contents of which are incorporated herein by reference.

TECHNICAL FIELD

The present invention relates to an indoor unit for an air-conditioning apparatus including a sensor configured to rotate and move along a first axis.

BACKGROUND ART

Hitherto, there has been known an indoor unit for an air-conditioning apparatus including a movable sensor assembly configured to move in an up and down direction (see, for example, Patent Literature 1). In the movable sensor assembly disclosed in Patent Literature 1, a motor configured to rotate a sensor is fixed to a case that is moved up and down.

CITATION LIST

Patent Literature

Patent Literature 1: Description of European Patent Application Publication No. 2184553

SUMMARY OF INVENTION

Technical Problem

However, in the indoor unit disclosed in Patent Literature 1, a wiring led out from the motor and a wiring led out from the sensor are moved up and down along with the up/down movement of the case, and the wiring led out from the sensor rotationally moves along with the rotation of the sensor. Accordingly, the leading of the wirings is elongated and complicated. In the indoor unit disclosed in Patent Literature 1, the leading of the wirings is elongated and complicated, and hence the wirings are liable to be degraded or damaged, and moreover, the indoor unit becomes larger.

The present invention has been made in view of the above-mentioned problems, and has an object, in an indoor unit for an air-conditioning apparatus including a sensor configured to rotate and move along a first axis, to suppress degradation of or damage to the wirings and, moreover, to downsize the indoor unit.

Solution to Problem

According to one embodiment of the present invention, there is provided an indoor unit for an air-conditioning apparatus including: a sensor box accommodating a sensor configured to detect light; a gearbox configured to hold the sensor box so as to be rotatable, and to be moved along a first axis together with the sensor box; a first motor configured to apply a force causing the sensor box to rotate; a second motor configured to apply a force causing the gearbox to move along the first axis; and a shaft inserted through the gearbox to be rotated by receiving the force from the first motor, in which, in the gearbox, the shaft is inserted, and the gear is accommodated so that a rotational force transmitted from the shaft is transmitted to the sensor box, the gear being movable along the first axis.

Advantageous Effects of Invention

According to one embodiment of the present invention, the indoor unit for an air-conditioning apparatus is configured such that the first motor and the second motor do not move along with the movement of the sensor box accommodating the sensor, and only the wiring that is led out from the sensor box moves along with the movement of the sensor box. Therefore, it is possible to shorten and simplify the leading of the wirings. As a result, according to the present invention, it is possible to suppress the degradation of or damage to the wirings, and to obtain a downsized indoor unit for an air-conditioning apparatus.

DESCRIPTION OF EMBODIMENTS

Now, with reference to the drawings, description is made of an embodiment of the present invention. In the drawings, the same or corresponding parts are denoted by the same reference symbols, and descriptions thereof are omitted or simplified as appropriate. Further, the shapes, sizes, positions, and other factors of the structures illustrated in the drawings may be changed as appropriate within the scope of the present invention.

Embodiment 1

[Indoor Unit for Air-Conditioning Apparatus]

Figure 1:
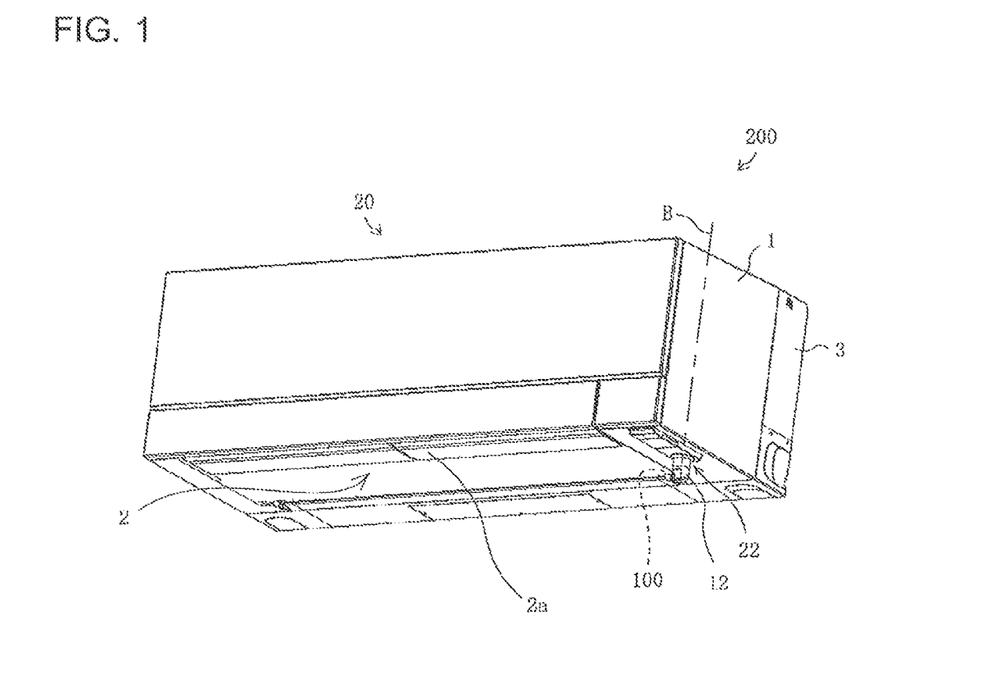
FIG. 1 is a perspective view for illustrating a state after an indoor unit for an air-conditioning apparatus according to Embodiment 1 of the present invention has received an operation-start instruction.
Figure 2:
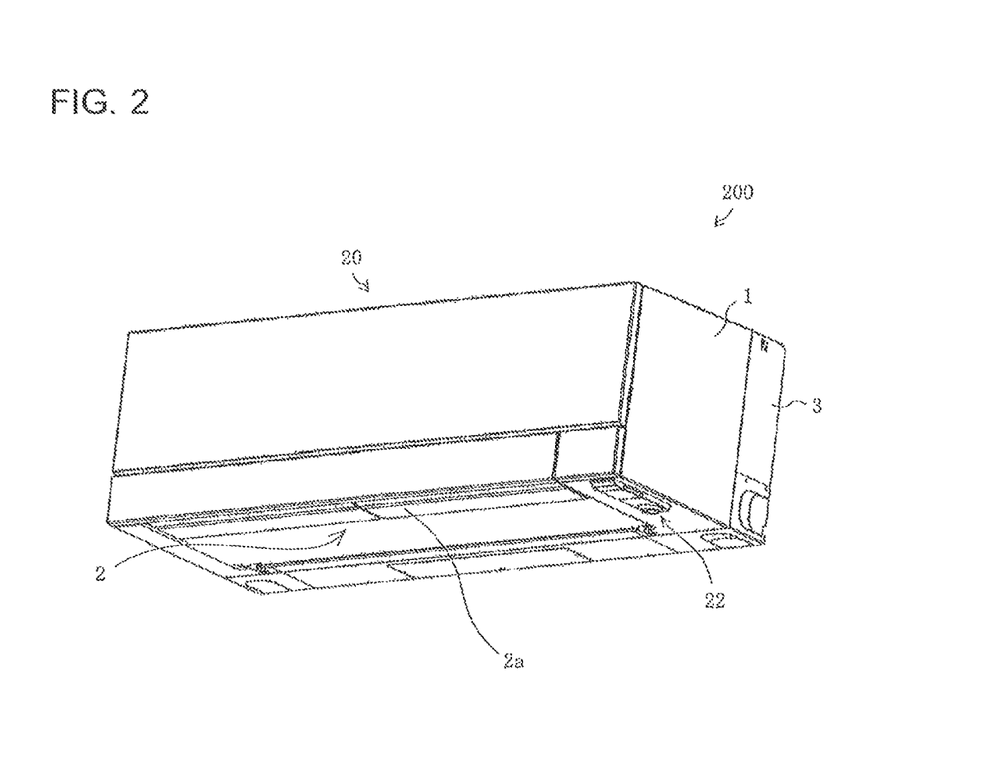
FIG. 2 is a perspective view for illustrating a state in which an operation of the indoor unit illustrated in FIG. 1 is stopped.
Figure 3:
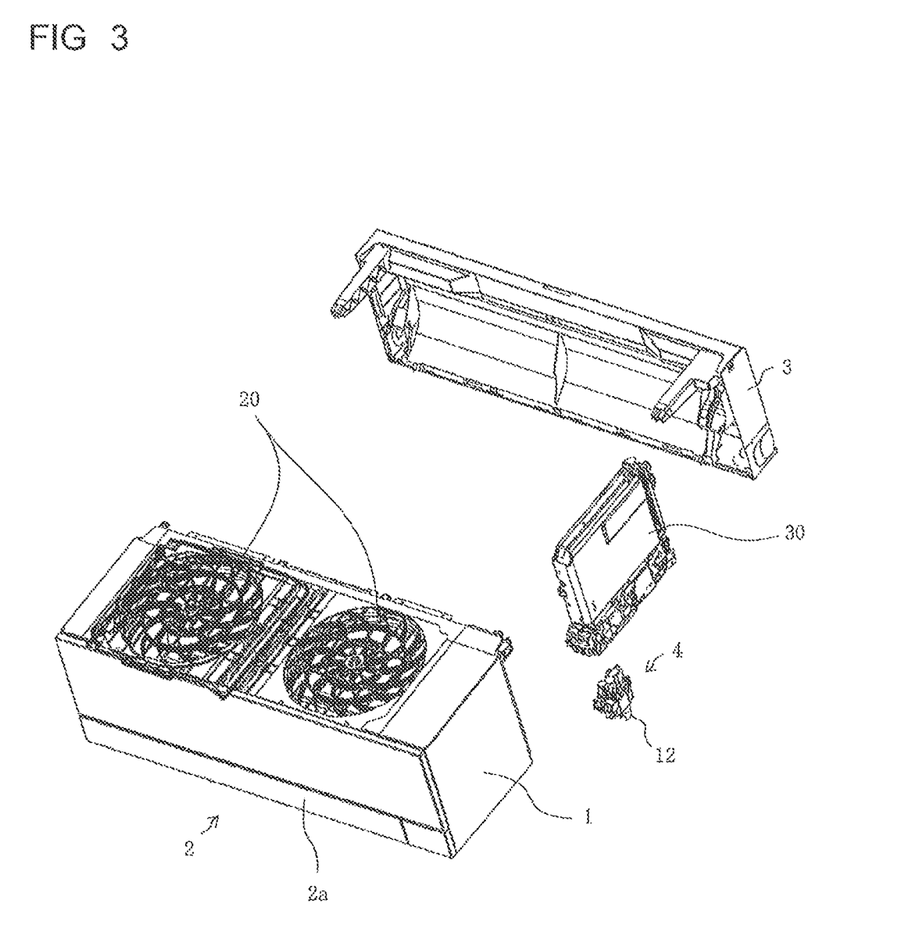
FIG. 3 is an exploded perspective view of the indoor unit illustrated in FIG. 1.

FIG. 1 is a perspective view for illustrating a state in which an indoor unit for an air-conditioning apparatus according to Embodiment 1 of the present invention has received an operation-start instruction. FIG. 2 is a perspective view for illustrating a state in which an operation of the indoor unit illustrated in FIG. 1 is stopped. FIG. 3 is an exploded perspective view of the indoor unit illustrated in FIG. 1. An indoor unit 200 for an air-conditioning apparatus according to Embodiment 1 is configured to supply conditioned air to an air-conditioned space such as a room by using a refrigeration cycle in which refrigerant is circulated.

As illustrated in FIG. 1, in the indoor unit 200 of an example of Embodiment 1, when the indoor unit 200 receives the operation-start instruction, a sensor box 12 projects from a sensor opening 22 formed in a bottom surface of the indoor unit 200. A sensor 100 is accommodated in the sensor box 12. The sensor 100 is, for example, an infrared sensor configured to detect infrared rays, and may detect the heat, position, movement, and other conditions of a detection target. When the sensor box 12 projects from the bottom surface of the indoor unit 200, the sensor 100 may detect, for example, the temperature distribution in the room, the position of a user in the room, the movement of the user in the room, and other conditions during the operation of the indoor unit 200. For example, the sensor box 12 is configured to move up and down along a second axis B extending in a vertical direction and to rotate about the second axis B. The rotation of the sensor box 12 about the second axis B enables the sensor 100 to detect the condition of the entire air-conditioned space.

Further, when the indoor unit 200 of the example of Embodiment 1 receives an operation-stop instruction, the sensor box 12 is accommodated in the indoor unit 200. When an operation of the indoor unit 200 is stopped, as illustrated in FIG. 2, the sensor box 12 is accommodated in the indoor unit 200.

As illustrated in FIG. 1 and FIG. 2, the indoor unit 200 includes a base 3 and a main body 1. The base 3 is fixed to a wall surface or another part in the room, and the main body 1 is mounted to the base 3. In the main body 1, there are provided air inlets 20 and an air outlet 22. The air inlets 20 are configured to take indoor air into the indoor unit 200, and the air outlet 22 is configured to supply conditioned air to an air-conditioning target area. An up/down airflow-direction plate 2a for controlling the up/down airflow direction is arranged at the air outlet 2. Further, a horizontal airflow-direction adjusting part (not shown) for controlling the horizontal airflow direction is arranged inside the main body 1. When a controller (not shown) controls the up/down airflow-direction plate 2a and the horizontal airflow-direction adjusting part, the indoor unit 200 may adjust the airflow directions of the conditioned air. In the example of Embodiment 1, as illustrated in FIG. 1 to FIG. 3, the air inlet 20 is formed in a top surface of the indoor unit 200, and the air outlet 2 is formed in an area including the bottom surface and a front surface of the indoor unit 200.

An air-sending fan (not shown), a heat exchanger (not shown), and other components are accommodated in the main body 1. The air-sending fan and the heat exchanger are provided inside the main body 1 at positions downstream of the air inlet 20 and upstream of the air outlet 2. In the example of Embodiment 1, the air-sending fan is an axial fan, which is, for example, a propeller fan, and is arranged upstream of the heat exchanger. The air-sending fan may be a cross-flow fan. When the air-sending fan is a cross-flow fan, the air-sending fan is arranged downstream of the heat exchanger in some cases. Operation of the air-sending fan causes the indoor air to be taken into the indoor unit 200 through the air inlet 20. The air taken into the indoor unit 200 is subjected to heat exchange in the heat exchanger, and the air having been subjected to the heat exchange is blown out through the air outlet 2. Thus, cool or warm conditioned air is supplied to the air-conditioning target area.

Further, as illustrated in FIG. 3, the indoor unit 200 of the example of Embodiment 1 includes an electric component box 30. A control device and other devices (not shown) are accommodated in the electric component box 30. The control device is configured to control the entire air-conditioning apparatus (not shown) to which, for example, the indoor unit 200 is connected, and includes, for example, an analog circuit, a digital circuit, a CPU, or a combination of at least two of those components. The control device is configured to adjust the strength, direction, temperature, or other conditions of the conditioned air by using, for example, operation information input to a remote controller (not shown) and information obtained by the sensor 100 of a sensor unit 4. The electric component box 30 is mounted to, for example, the base 3. When the main body 1 is mounted to the base 3, the electric component box 30 is accommodated in the indoor unit 200. The sensor unit 4 is mounted to the bottom of the electric component box 30 with, for example, claws or other members.

[Sensor Unit]

Next, the sensor unit 4 of the example of Embodiment 1 is described.

Figure 4:
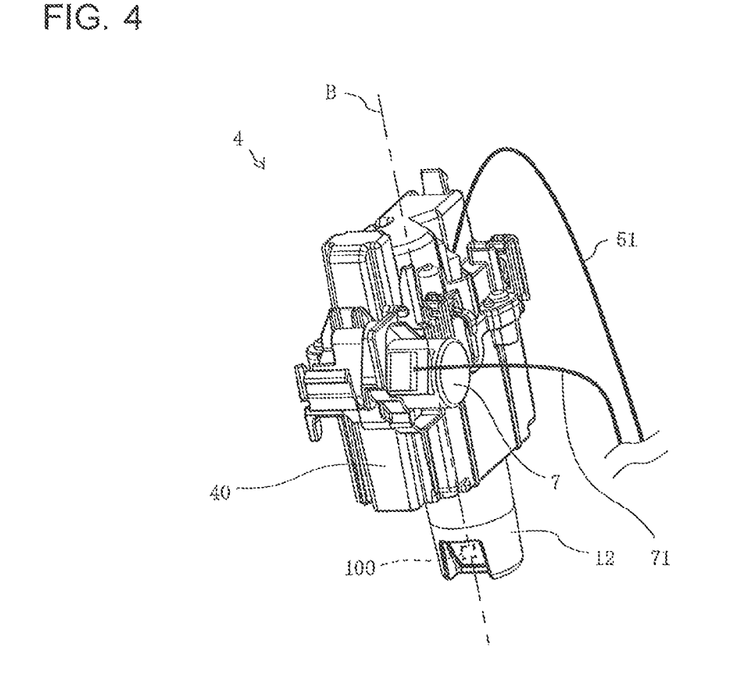
FIG. 4 is an enlarged view of a sensor unit illustrated in FIG. 3.
Figure 5:
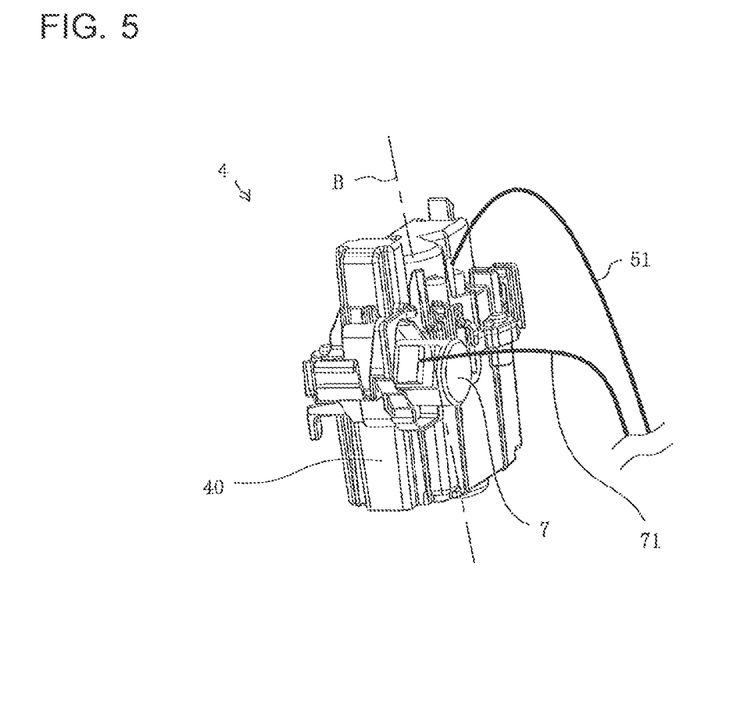
FIG. 5 is a view for illustrating a state in which the sensor unit illustrated in FIG. 4 accommodates a sensor box in a case.
Figure 6:
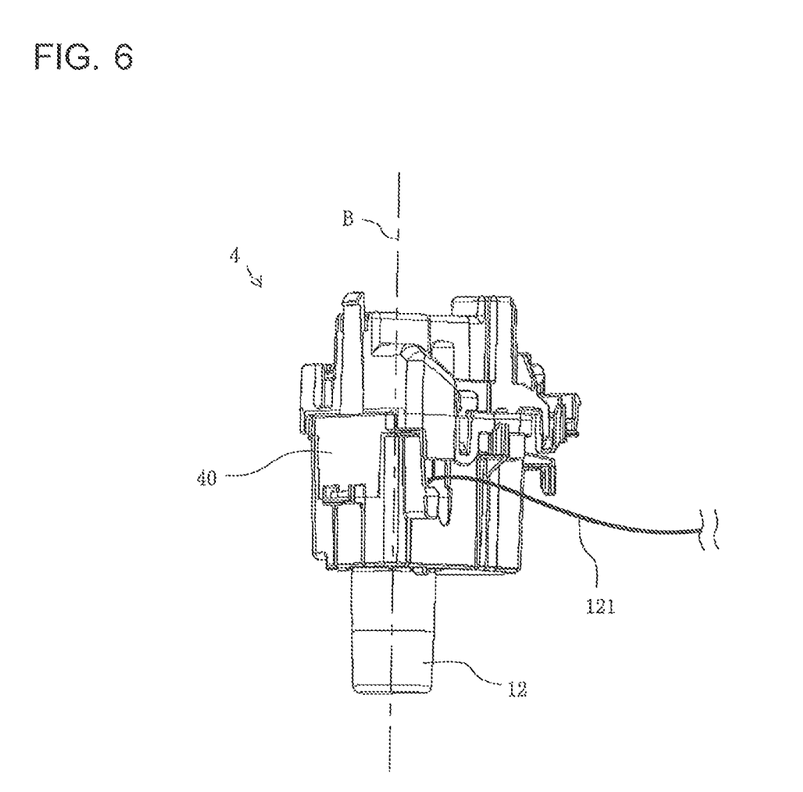
FIG. 6 is a view of the sensor unit illustrated in FIG. 4, as viewed in an angle different from the angle in FIG. 4.
Figure 7:
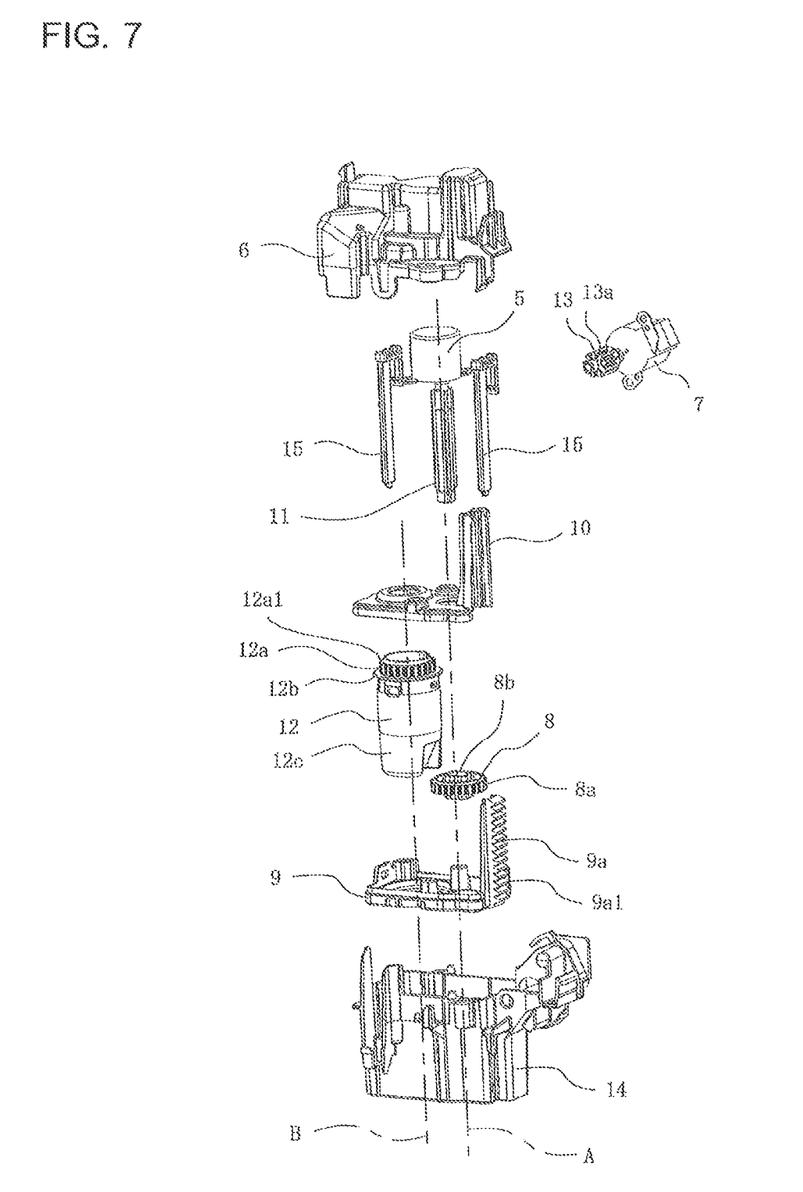
FIG. 7 is an exploded perspective view of the sensor unit illustrated in FIG. 4.
Figure 8:
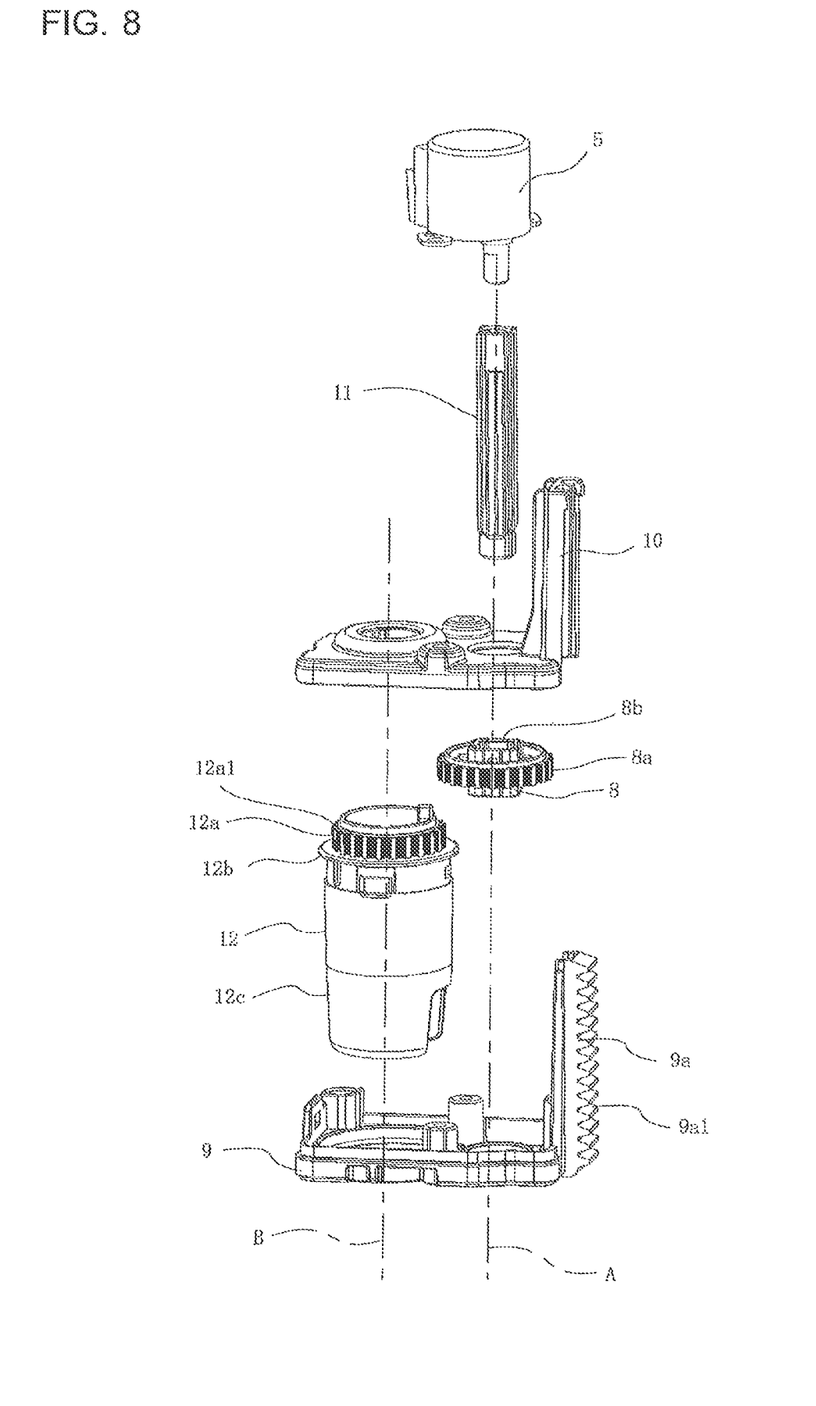
FIG. 8 is an enlarged view for illustrating a first motor, a shaft, a gear, a gearbox, and a sensor box, which are illustrated in FIG. 7.
Figure 9:
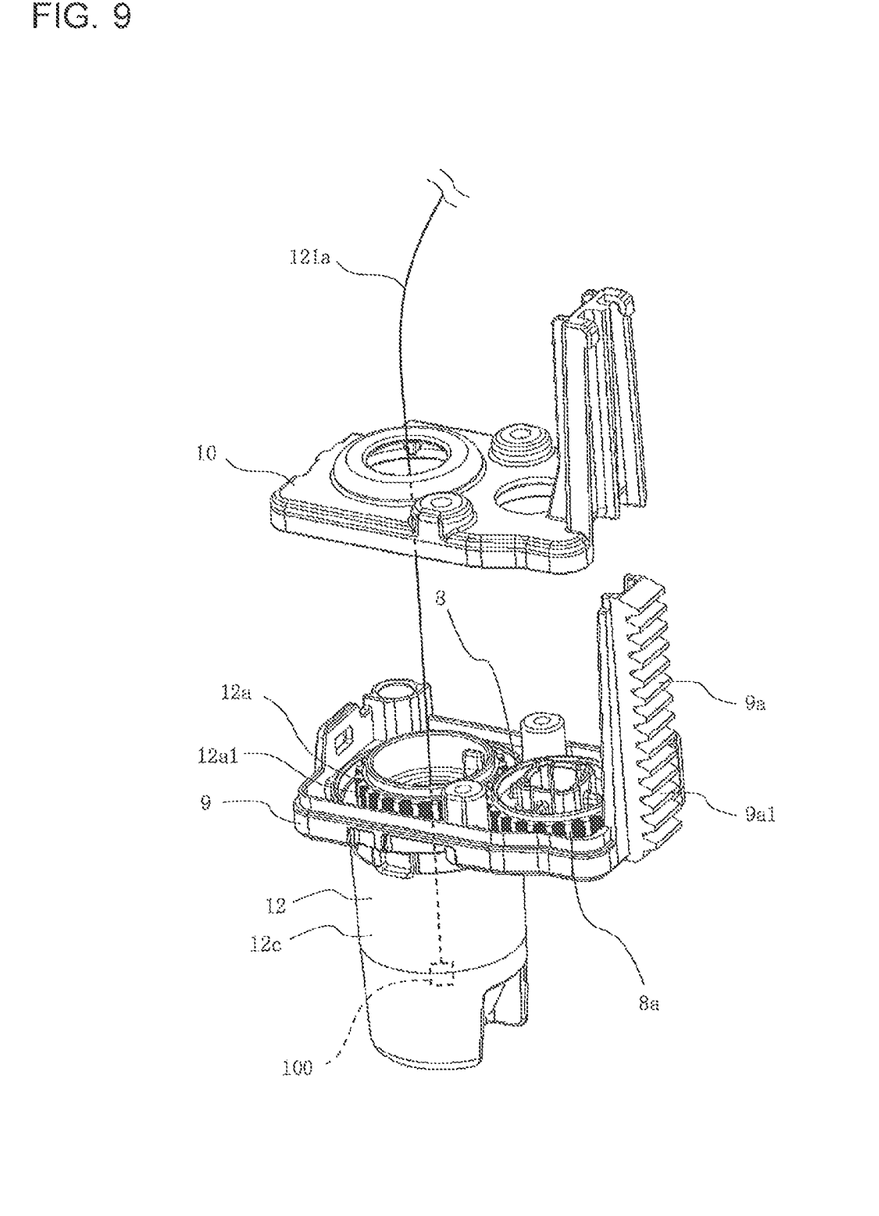
FIG. 9 is a view for illustrating a state in which the gear and the sensor box are installed in a gearbox housing illustrated in FIG. 8, and a gearbox cover is not mounted yet.
Figure 10:
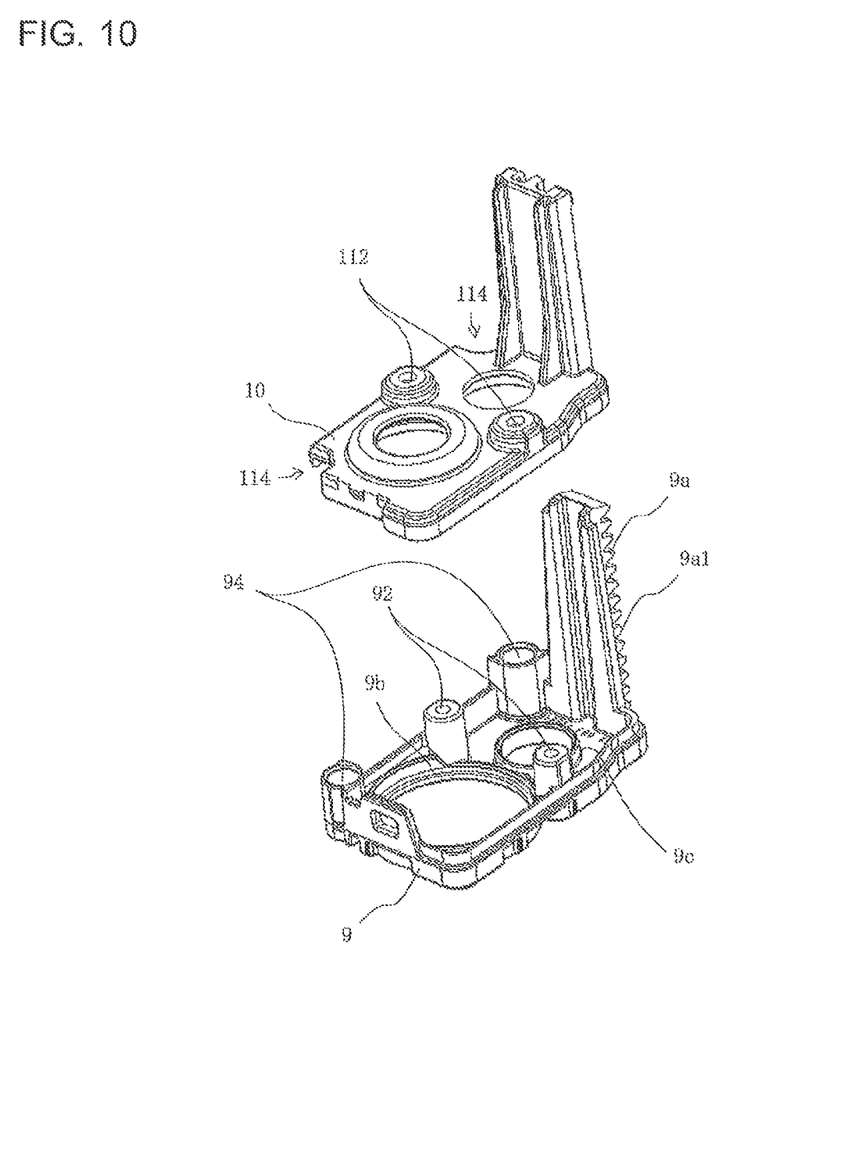
FIG. 10 is an enlarged perspective view for illustrating the gearbox housing and the gearbox cover, which are illustrated in FIG. 9.
Figure 11:
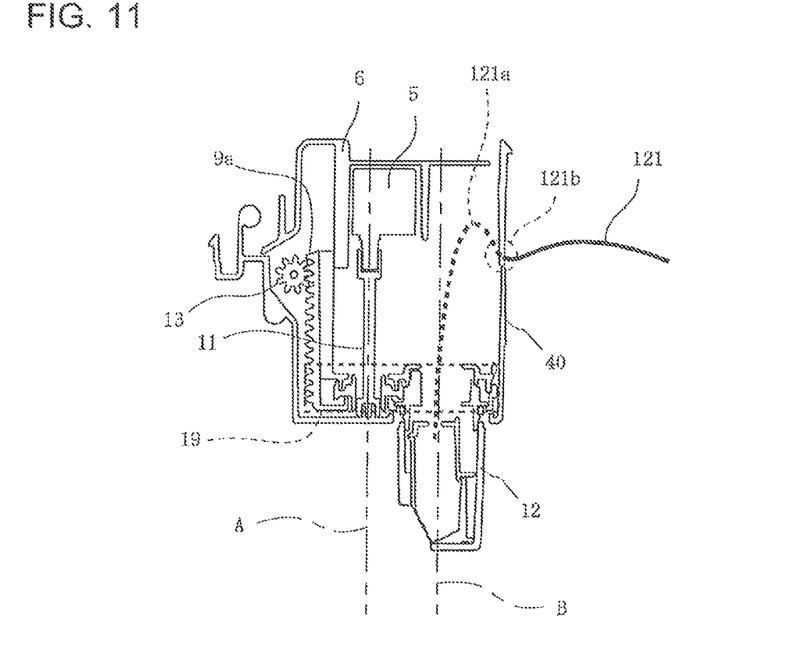
FIG. 11 is an explanatory view for illustrating a movement when the sensor box projects from the case in the sensor unit illustrated in FIG. 4.
Figure 12:
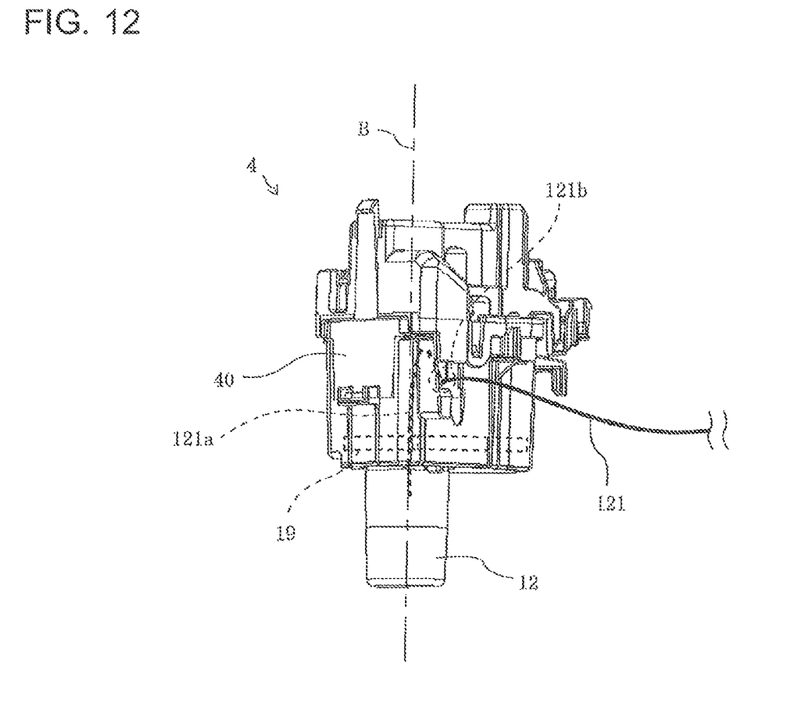
FIG. 12 is a view for illustrating a state of a wiring when the sensor box projects from the case.
Figure 13:
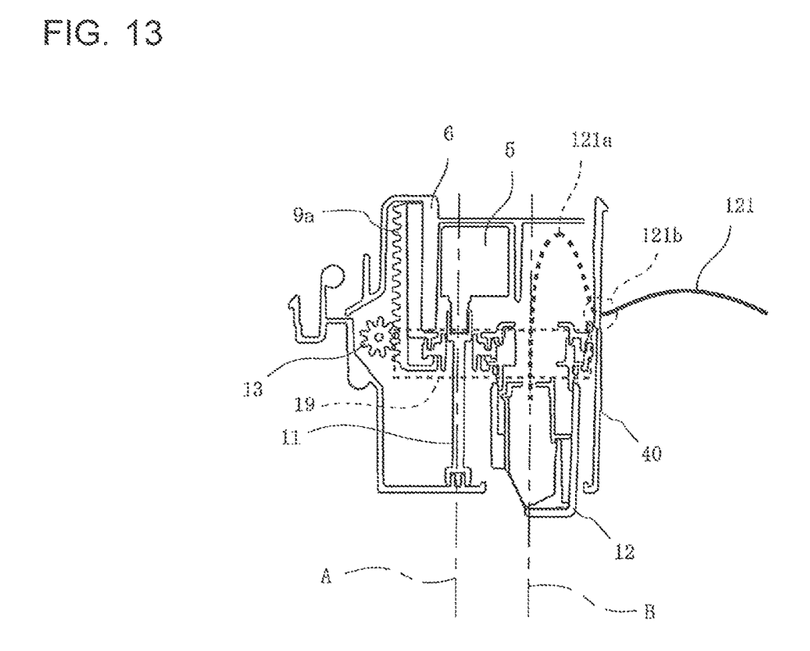
FIG. 13 is an explanatory view for illustrating a movement when the sensor box is accommodated in the case in the sensor unit illustrated in FIG. 5.
Figure 14:
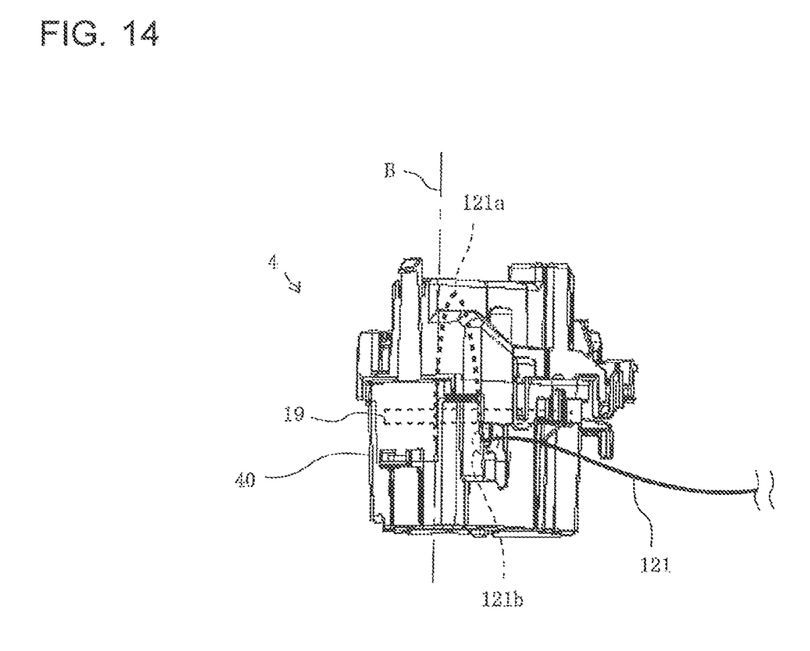
FIG. 14 is an explanatory view for illustrating a state of the wiring when the sensor box is accommodated in the case.
Figure 15:
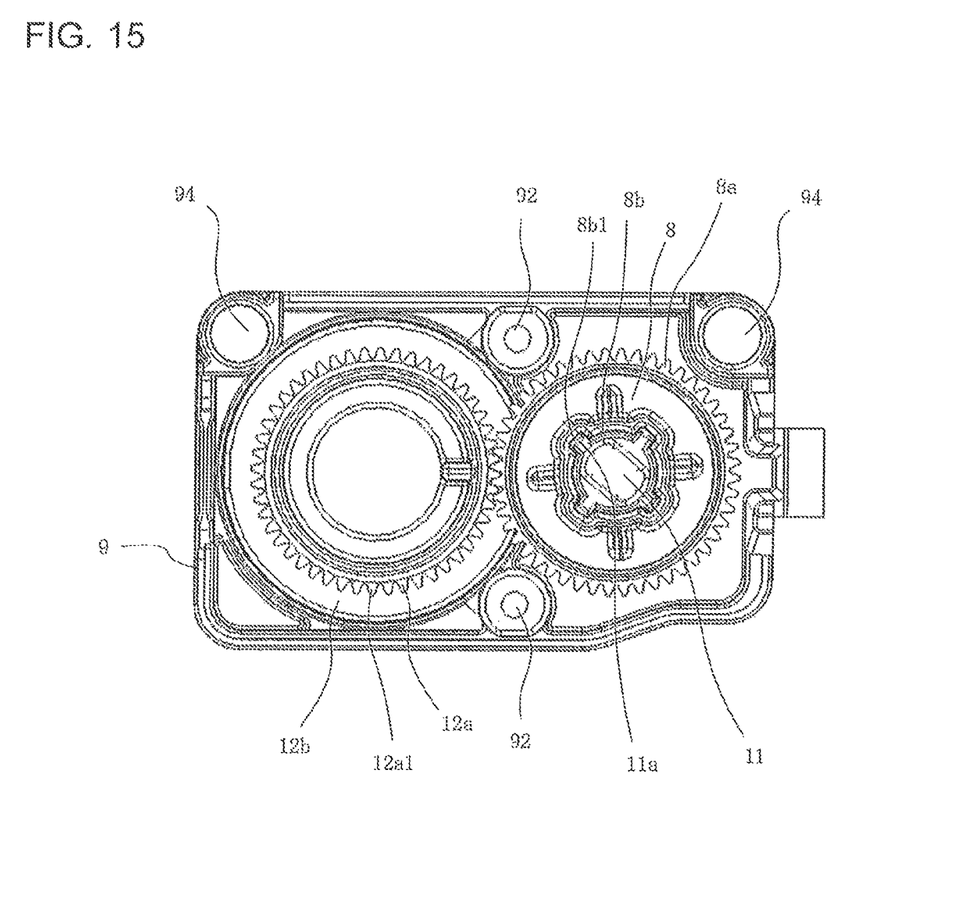
FIG. 15 is an explanatory view for illustrating the configuration of the gearbox illustrated in FIG. 13.

FIG. 4 is an enlarged view of the sensor unit illustrated in FIG. 3. FIG. 5 is a view for illustrating a state in which the sensor unit illustrated in FIG. 4 accommodates the sensor box in a case. FIG. 6 is a view of the sensor unit illustrated in FIG. 4, as viewed in an angle different from the angle in FIG. 4. FIG. 7 is an exploded perspective view of the sensor unit illustrated in FIG. 4. FIG. 8 is an enlarged view for illustrating a first motor, a shaft, a gear, a gearbox, and the sensor box, which are illustrated in FIG. 7. FIG. 9 is a view for illustrating a state in which the gear and the sensor box are installed in a gearbox housing illustrated in FIG. 8, and a gearbox cover is not mounted yet. FIG. 10 is an enlarged perspective view for illustrating the gearbox housing and the gearbox cover, which are illustrated in FIG. 9. FIG. 11 is an explanatory view for illustrating a movement when the sensor box projects from the case in the sensor unit illustrated in FIG. 4. FIG. 12 is a view for illustrating a state of a wiring when the sensor box projects from the case. FIG. 13 is an explanatory view for illustrating a movement when the sensor box is accommodated in the case in the sensor unit illustrated in FIG. 5. FIG. 14 is an explanatory view for illustrating a state of the wiring when the sensor box is accommodated in the case. FIG. 15 is an explanatory view for illustrating the configuration of the gearbox illustrated in FIG. 13.

As illustrated in FIG. 4 and FIG. 5, the sensor unit 4 includes a case 40 and the sensor box 12. The sensor box 12 is mounted to the case 40 so as to be movable along the second axis B. Under a state in which the sensor box 12 projects from the case 40 as illustrated in FIG. 4, the sensor box 12 projects from the bottom surface of the indoor unit 200 as illustrated in FIG. 1. Further, under a state in which the sensor box 12 is accommodated in the case 40 as illustrated in FIG. 5, the sensor box 12 is accommodated in the indoor unit 200 as illustrated in FIG. 2.

As illustrated in FIG. 4 and FIG. 6, a first wiring 51, a second wiring 71, and a third wiring 121 are led out from the sensor unit 4 in Embodiment 1. The first wiring 51 illustrated in FIG. 4 is led out from a first motor 5 illustrated in FIG. 7. The second wiring 71 illustrated in FIG. 4 is led out from a second motor 7. The third wiring 121 illustrated in FIG. 6 is led out from the sensor box 12. The first wiring 51, the second wiring 71, and the third wiring 121, which are led out from the sensor unit 4, are connected to, for example, the control device (not shown) in the electric component box 30 illustrated in FIG. 3. The sensor unit 4 is immovably mounted to the electric component box 30, and hence the first wiring 51, the second wiring 71, and the third wiring 121, which are led out from the sensor unit 4, do not move along with the movement of the sensor box 12.

As illustrated in FIG. 7, the sensor unit 4 of the example of Embodiment 1 includes a first case 6, a second case 14, the first motor 5, a shaft 11, the second motor 7, a pinion 13, a gearbox housing 9, a gearbox cover 10, a gear 8, the sensor box 12, and guide shafts 15. The case 40 illustrated in FIG. 4 is formed by fixing the first case 6 and the second case 14 together with, for example, claws or screws. For example, as illustrated in FIG. 7, the first motor 5, the shaft 11, the pinion 13, the gearbox housing 9, the gearbox cover 10, the gear 8, and the sensor box 12 are accommodated in an interior space of the case 40. The first case 6 and the second case 14 are made of, for example, a transparent resin material, so that an assembly state or other states in the case 40 may be visually checked.

As illustrated in FIG. 7 and FIG. 8, the first motor 5, the shaft 11, and the gear 8 are arranged on a first axis A. The first motor 5 is configured to apply a force that causes the sensor box 12 to rotate. The first motor 5 is fixed to the first case 6 with, for example, screws, on the inside the first case 6. The first motor 5 may be fixed to the first case 6 on the outside the first case 6.

The shaft 11 rotates by receiving a force from the first motor 5, and has an elongated cylindrical shape extending along the first axis A. The shaft 11 passes through the gearbox 19 (see FIG. 13 to FIG. 15), which is formed by combining the gearbox housing 9 and the gearbox cover 10, and rotates the gear 8 accommodated in the gearbox 19. As illustrated in FIG. 15, a plurality of projection ribs 11a, which are formed parallel to the first axis A, are formed on an outer periphery of the shaft 11. In the example of Embodiment 1, the shaft 11 is directly mounted to the first motor 5. However, the shaft 11 may be configured to receive a force from the first motor 5 via one or more gears. With such a configuration that the shaft 11 receives a force from the first motor 5 via one or more gears, the mounting position of the first motor 5 may be changed.

The gear 8 is configured to transmit a rotational force transmitted from the shaft 11 to the sensor box 12. The gear 8 is accommodated in the gearbox 19, which is formed by combining the gearbox housing 9 and the gearbox cover 10, so as to be rotatable. An insertion hole 8b through which the shaft 11 is inserted is formed in an inner periphery of the gear 8. The insertion hole 8b has grooves 8b1 into which the projection ribs 11a of the shaft 11 are inserted. When the shaft 11 rotates, the projection ribs 11a and the grooves 8b1 interfere with each other so that the gear 8 rotates. Further, as illustrated in FIG. 7 and FIG. 8, the gear 8 slides over the shaft 11 along the first axis A, and hence may move along the first axis A. A plurality of teeth 8a that mesh with teeth 12a1 of a sensor-box gear part 12a of the sensor box 12 are formed on an outer periphery of the gear 8.

The sensor box 12 has an elongated cylindrical shape and is arranged on the second axis B, which is substantially parallel to the first axis A. The sensor box 12 rotates by receiving a force from the first motor 5 transmitted from the gear 8 and includes the sensor-box gear part 12a, a flange part 12b, and a sensor accommodating part 12c. The sensor-box gear part 12a is formed above the flange part 12b and the sensor accommodating part 12c, and the plurality of teeth 12a1 are formed on an outer periphery of the sensor-box gear part 12a.

The flange part 12b is formed below the sensor-box gear part 12a and above the sensor accommodating part 12c, and is formed to have a larger diameter than the sensor-box gear part 12a and the sensor accommodating part 12c. The flange part 12b is placed on a flange placement part 9b of the gearbox housing 9 (see FIG. 10), and hence the sensor box 12 is held by the gearbox 19 (see FIG. 13 to FIG. 15) so as to be rotatable. The flange part 12b, which has a larger diameter than the sensor-box gear part 12a and the sensor accommodating part 12c, rotates while sliding on the flange placement part 9b, and hence the sensor box 12 stably and smoothly rotates.

The sensor accommodating part 12c is formed below the sensor-box gear part 12a and the flange part 12b, and projects downward from the flange part 12b. As illustrated in FIG. 9, the sensor 100 is accommodated in the sensor accommodating part 12c. A wiring 121a that is led out from the sensor 100 is led out above the sensor box 12. The wiring 121a is led out from the top of the sensor box 12, and hence slack of the wiring 121a required for causing the sensor box 12 to rotate may be reduced. As a result, the length of the wiring 121a may be reduced. Preferably, the length of the wiring 121a may further be reduced when the wiring 121a is led out from the second axis B about which the sensor box 12 rotates, or from the vicinity of the second axis B. As illustrated in FIG. 11 to FIG. 14, the wiring 121a is fixed to the case 40 with a wiring fixing part 121b, and hence may move only inside the case 40. With the configuration in which the wiring 121a may move only inside the case 40, there may be prevented a risk of the wiring 121a and the third wiring 121, which are led out from the sensor box 12, rubbing other components on the outside of the case 40, a risk of the wiring 121a and the third wiring 121 being caught by components on the outside of the case 40, and other risks. The fixing of the wiring 121a with the wiring fixing part 121b is achieved by using, for example, a cable tie or resin.

Through fixation of the gearbox housing 9 and the gearbox cover 10, which are illustrated in FIG. 10, with screws, the gearbox 19, which is illustrated in FIG. 13 to FIG. 15, is formed. The gearbox 19 holds the sensor box 12 so as to allow rotation of the sensor box 12, and moves along the first axis A together with the sensor box 12. Further, the gear 8 is accommodated in the gearbox 19. As illustrated in FIG. 10, the gearbox housing 9 has a rack part 9a, the flange placement part 9b, a gear holding part 9c, screw fixing parts 92, and guide holes 94. The gearbox cover 10 has screw insertion holes 112 and guide cutout portions 114. Through combination of the gearbox housing 9 and the gearbox cover 10, insertion of screws (not shown) from the screw insertion holes 112, and fastening of the screws using the screw fixing parts 92, the gearbox housing 9 and the gearbox cover 10 are fixed together, and thus the gearbox 19 is formed. The flange placement part 9b serves as a part on which the flange part 12b of the sensor box 12 is placed. The gear holding part 9c holds the gear 8 so as to allow rotation of the gear 8. The rack part 9a moves the gearbox 19 along the first axis A by receiving a force from the pinion 13, and has a plate shape extending parallel to the first axis A. The rack part 9a has teeth 9a1 that mesh with teeth 13a of the pinion 13.

The second motor 7 is configured to apply a force that moves the gearbox 19 along the first axis A. The second motor 7 is fixed to the second case 14 with, for example, screws, on the outside of the second case 14. The second motor 7 may be fixed to the second case 14 on the inside of the second case 14.

The pinion 13 rotates by receiving a force from the second motor 7, and transmits a force to the sensor-box gear part 12a of the sensor box 12. The pinion 13 has the teeth 13a on an outer periphery thereof. In the example of Embodiment 1, the pinion 13 is directly mounted to the second motor 7. However, the pinion 13 may be configured so as to receive a force from the second motor 7 via one or more gears. With such a configuration that the pinion 13 receives a force from the second motor 7 via one or more gears, the mounting position of the second motor 7 may be changed.

The guide shafts 15 illustrated in FIG. 7 are mounted to the first case 6, and extend parallel to the first axis A. The guide shafts 15 are configured to guide the sensor box 12, which moves along the first axis A, and are inserted through the gearbox 19 by means of the guide holes 94 in the gearbox housing 9 and the guide cutout portions 114 in the gearbox cover 10, which are illustrated in FIG. 10. The guide shafts 15 are inserted through the gearbox 19 so that the gearbox 19 is prevented from rotating. In the example of Embodiment 1, two guide shafts 15 are provided. However, it is only necessary that at least one guide shaft 15 be provided. Further, in the example of Embodiment 1, the guide shafts 15 are mounted to the first case 6. However, the guide shafts 15 may be mounted to the first case 6 or the second case 14.

[Operation of Sensor Unit]

Next, an operation of the sensor unit 4 of the example of Embodiment 1 is described.

First, an up/down movement operation of the sensor box 12 is described. When the second motor 7 illustrated in FIG. 7 operates, the pinion 13 rotates. As illustrated in FIG. 11 and FIG. 13, when the pinion 13 rotates, a force is transmitted to the rack part 9a of the gearbox 19. Accordingly, the gearbox 19 moves up and down along the first axis A. Along with the up/down movement of the gearbox 19 along the first axis A, the sensor box 12 held by the gearbox 19 moves up and down along the second axis B, which is parallel to the first axis A. As illustrated in FIG. 11 to FIG. 14, in Embodiment 1, it is configured such that, among the wirings led out from the sensor box 12, only the wiring 121a accommodated in the case 40 may move. In Embodiment 1, the wirings led out from the sensor box 12 may move only inside the case 40, and hence a risk of degradation of or damage to the wirings is reduced.

Further, in Embodiment 1, the first motor 5, the shaft 11, and the gear 8, which are the configurations for causing the sensor box 12 to rotate, are arranged on the first axis A, which is parallel to the second axis B, along which the sensor box 12 moves up and down. Consequently, in Embodiment 1, it is possible to lead out the wiring 121a above the sensor box 12. Further, no movable member is arranged above the sensor box 12, and hence leading of the wiring 121a in the case 40 is easy. Accordingly, the risk of degradation of or damage to the wiring 121a is further reduced.

Next, a rotating operation of the sensor box 12 is described. When the first motor illustrated in FIG. 7 operates, the shaft 11 rotates. As illustrated in FIG. 15, through rotation of the shaft 11, the gear 8 rotates, and hence the sensor box 12 rotates. In Embodiment 1, the wiring 121a is led out above the sensor box 12, and hence slack of the wiring 121a may be reduced. Accordingly, the length of the wiring 121a may be reduced.

As described above, the indoor unit 200 for an air-conditioning apparatus according to Embodiment 1 includes the sensor box 12 that accommodates the sensor 100 configured to detect light, the gearbox 19 that holds the sensor box 12 so as to allow rotation of the gear box and that moves along the first axis A together with the sensor box 12, the first motor 5 configured to apply a force that causes the sensor box 12 to rotate, the second motor 7 configured to apply a force that moves the gearbox 19 along the first axis A, and the shaft 11 that is inserted through the gearbox 19 and rotates by receiving a force from the first motor 5. The gear 8, through which the shaft 11 is inserted and which transmits a rotational force transmitted from the shaft 11 to the sensor box 12, is accommodated in the gearbox 19. The gear 8 is movable along the first axis A. In Embodiment 1, only the wiring 121a led out from the sensor box 12 may move along with the rotation of the sensor box 12 and movement thereof along the first axis A. Consequently, it is possible to shorten and simplify the leading of the wiring 121a. In Embodiment 1, only the wiring 121a moves along with the movement of the sensor box 12, and hence the risk of degradation of or damage to the wirings is suppressed. Moreover, according to Embodiment 1, the leading of the wiring 121a, which moves along with the movement of the sensor box 12, is short and simple, and hence the indoor unit 200 may be downsized.

Further, according to Embodiment 1, it is configured such that the first motor 5, the first wiring 51, which is led out from the first motor 5, the second motor 7, the second wiring 71, which is led out from the second motor 7, and the third wiring 121, which is the portion of the wiring led out from the sensor box 12 except for the wiring 121a, do not move along with the movement of the sensor box 12, and hence the rotating operation and axial-direction operation of the sensor box 12 may be smoothly performed with a small force. Moreover, a risk of breaking and other risks due to wear of or repeated stress on the first wiring 51, the second wiring 71 and the third wiring 121 are suppressed.

Preferably, when the wiring 121a led out from the sensor box 12 is led out from the second axis B, about which the sensor box 12 rotates, or from the vicinity of the second axis B, it is possible to reduce slack of the wiring 121a for causing the sensor box 12 to rotate. Consequently, the length of the wiring 121a may further be reduced.

In the above, description is made of the case in which the first axis A, along which the sensor box 12 moves in the axial direction, and the second axis B, about which the sensor box 12 rotates, are substantially parallel to each other. However, the first axis A and the second axis B may be arranged at an angle other than parallel by, for example, changing the shapes of the gear 8 and the sensor-box gear part 12a or by arranging one or more gears between the gear 8 and the sensor-box gear part 12a.

Further, preferably, with such a configuration that the sensor-box gear part 12a that meshes with the gear 8 is formed on an outer periphery of the sensor box 12, the shaft 11 is mounted to the first motor 5, the pinion 13 is mounted to the second motor 7, and the rack part 9a that meshes with the pinion 13 is formed on the gearbox 19, the number of components is reduced. Accordingly, the indoor unit 200 having a simple configuration may be obtained.

Further, preferably, the sensor unit 4 includes the first case 6, to which the first motor 5 is fixed, and the second case 14, which is mounted to the first case 6 and to which the second motor 7 is fixed. The gearbox 19 is accommodated in the interior space formed by the first case 6 and the second case 14. With this configuration, the configurations for moving the sensor box 12 are formed into a module, thereby being capable of simplifying the manufacturing process of the indoor unit 200. Preferably, the first case 6 and the second case 14 are made of a transparent resin material so that, for example, the leading state of the wiring 121*a* and other states in the case 40 may be visually checked.

Further, preferably, with such a configuration that, when the sensor box 12 moves, the wirings led out from the sensor box 12 may move only inside the case 40, which is formed of the first case 6 and the second case 14, the risk of degradation of or damage to the movable wiring 121*a* may be suppressed.

Further, preferably, with such a configuration that at least one guide shaft 15 mounted to the first case 6 or the second case 14 and extending parallel to the first axis A is additionally provided, and that the guide shaft 15 guides the sensor box 12, which moves along the first axis A, the sensor box 12 smoothly moves along the first axis A, and rotation of the sensor box 12 is further prevented.

In the indoor unit 200 for an air-conditioning apparatus having the configuration described above, the sensor box 12 projects from the bottom of the indoor unit 200 during operation of the indoor unit 200, and the sensor box 12 is accommodated in the indoor unit 200 when the operation of the indoor unit 200 is stopped. To adopt the configuration in which the sensor box 12 is caused to project from the bottom of the indoor unit 200, there may be reduced a risk in that the field of view of the sensor 100 is blocked. Accordingly, the overall condition of the air-conditioned space may be appropriately detected. Further, the sensor box 12 is accommodated in the indoor unit 200 when the operation of the indoor unit 200 is stopped, and hence the designability of the indoor unit 200 is improved. Further, there may be prevent a risk in that the sensor box 12 is deformed or damaged during the transportation of the indoor unit 200, or in other situations.

The present invention is not limited to the above-mentioned embodiment and may be variously modified within the scope of the present invention. Specifically, the configuration of the above-mentioned embodiment may be improved as appropriate, or at least a part of the configuration may be replaced with another configuration. Moreover, the components whose positions are not particularly limited do not have to be arranged at the positions disclosed in the embodiment, and may be arranged at any positions in which the components may exert their functions.

For example, in the above, description is made of the example in which the sensor box 12 projects from the bottom of the indoor unit 200. However, it is also possible to configure such that the sensor box 12 projects from portions other than the bottom of the indoor unit 200.

REFERENCE SIGNS LIST

1 main body 2 air outlet 2*a* up/down airflow-direction plate 3 base sensor unit 5 first motor 6 first case 7 second motor 8 gear teeth 8*b* insertion hole 8*b*1 groove 9 gearbox housing 9*a* rack part 9*a*1 teeth 9*b* flange placement part 9*c* gear holding part 10 gearbox cover 11 shaft 11*a* projection rib 12 sensor box 12*a* sensor-box gear part 12*a*1 teeth 12*b* flange part 12*c* sensor accommodating part 13 pinion 13*a* teeth 14 second case 15 guide shaft 19 gearbox 20 air inlet 22 sensor opening electric component box 40 case 51 first wiring 71 second wiring 92 screw fixing part 94 guide hole 100 sensor 112 screw insertion hole 114 guide cutout portion 121 third wiring 121*a* wiring 121*b* wiring fixing part 200 indoor unit A first axis B second axis

The invention claimed is:

1. An indoor unit for an air-conditioning apparatus, comprising:
   a sensor box accommodating a sensor configured to detect light;
   a gear configured to rotate the sensor box;
   a gearbox configured to hold the sensor box rotationally and to accommodate the gear;
   a shaft inserted through the gear and the gearbox;
   a first motor configured to rotate the shaft to rotate the gear to cause the gear to rotate the sensor box; and
   a second motor configured to cause the gearbox to move along a first axis, wherein
   the sensor box and the gear are configured to move along the first axis together with the gearbox,
   a wiring from the sensor box is led out from a second axis about which the sensor box rotates or from a vicinity of the second axis, and
   the wiring passes through an opening formed in the sensor box, and teeth of the gear surround the opening.

2. The indoor unit for an air-conditioning apparatus of claim 1, wherein the first axis and the second axis are substantially parallel to each other.

3. The indoor unit for an air-conditioning apparatus of claim 1, wherein a sensor-box gear part that meshes with the gear is formed in an outer periphery of the sensor box.

4. The indoor unit for an air-conditioning apparatus of claim 1, wherein the shaft is mounted to the first motor.

5. The indoor unit for an air-conditioning apparatus of claim 1, further comprising a pinion mounted to the second motor, wherein the gearbox has a rack part that meshes with the pinion.

6. The indoor unit for an air-conditioning apparatus of claim 1, further comprising:
   a first case to which the first motor is fixed; and
   a second case that is mounted to the first case and to which the second motor is fixed,
   wherein the gearbox is accommodated in an interior space formed by the first case and the second case.

7. The indoor unit for an air-conditioning apparatus of claim 6, wherein, when the sensor box moves, the wiring led out from the sensor box is movable on an inside of the interior space and is immovable on an outside of the interior space.

8. The indoor unit for an air-conditioning apparatus of claim 6, further comprising at least one guide shaft that is mounted to the first case or the second case and that extends parallel to the first axis, wherein the guide shaft guides the sensor box, which moves along the first axis.

9. The indoor unit for an air-conditioning apparatus of claim 1, wherein, while the indoor unit for the air-conditioning apparatus is operating, the sensor box projects from a bottom of the indoor unit for the air-conditioning apparatus, and while the indoor unit for the air-conditioning apparatus is not operating, the sensor box is accommodated in the indoor unit for the air-conditioning apparatus.

10. An indoor unit for an air-conditioning apparatus, comprising:
    a sensor box accommodating a sensor configured to detect light;
    a gear configured to rotate the sensor box;

a gearbox configured to hold the sensor box rotationally and to accommodate the gear;

a shaft inserted through the gear and the gearbox;

a first motor configured to rotate the shaft to rotate the gear to cause the gear to rotate the sensor box; and a second motor configured to cause the gearbox to move along a first axis, wherein the sensor box and the gear are configured to move along the first axis together with the gearbox, the indoor unit further comprises a first case to which the first motor is fixed and a second case that is mounted to the first case and to which the second motor is fixed, and the gearbox is accommodated in an interior space formed by the first case and the second case.

11. The indoor unit for an air-conditioning apparatus of claim 10, wherein, when the sensor box moves, the wiring led out from the sensor box is movable on an inside of the interior space and is immovable on an outside of the interior space.

12. The indoor unit for an air-conditioning apparatus of claim 10, further comprising at least one guide shaft that is mounted to the first case or the second case and that extends parallel to the first axis, wherein the guide shaft guides the sensor box, which moves along the first axis.

* * * * *